United States Patent Office.

HARRIET M. FISH, OF NEW YORK, N. Y.

Letters Patent No. 67,182, dated July 30, 1867.

---

IMPROVED ROUGE-PAD.

---

The Schedule referred to in these Letters Patent and making part of the same.

---

TO ALL WHOM IT MAY CONCERN:

Be it known that I, HARRIET M. FISH, of the city and county of New York, and State of New York, have invented a certain new and useful manufacture known as a Rouge-Pad, to be used in the art of embellishing the human skin; and I do hereby declare the following to be such a full, clear, and exact description thereof, as will enable any one skilled in the art to which it appertains to make and use the same.

In practising my invention, I take a soft cotton fabric, known as Canton flannel, which for this purpose should be made with a pile on both sides. I then make a solution of the best quality of carmine and the juice of the blood-beet, strawberry, and hollyhock root, together with the extract of sweet clover and water. These ingredients I combine or unite in about the following proportions, that is to say, carmine, one-twelfth of an ounce; powdered beet juice, one-twelfth of an ounce; strawberry juice, one-twelfth of an ounce; extract of hollyhock root, one-twelfth of an ounce; extract of sweet clover, one-twelfth of an ounce; water enough to make a thin solution.

In this solution I thoroughly saturate the fabric as often as may be necessary to sufficiently charge it with the coloring matter. After the fabric has dried the pad may be cut to the desired form and size and put up for market, or the fabric may be cut previous to the application of the coloring matter, as may be found most expedient.

The application of the coloring matter is made to the skin by simply dampening and rubbing the pad against it, whenever it may be desired.

I claim, and desire to secure by Letters Patent—

1. Uniting or combining, with a soft cotton or other suitable fabric, a solution, consisting of the aforementioned ingredients, without intending to confine myself to the proportions thereof as therein given.

2. I claim the manufacture of a rouge-pad, by uniting or combining, with a soft cotton or other suitable fabric, a coloring matter, consisting of the above-mentioned ingredients, or their equivalents, for this purpose, substantially as described.

HARRIET M. FISH.

Witnesses:
    AMOS BROADNAX,
    ISAAC S. MILLER.